United States Patent [19]
Muller

[11] 3,711,822
[45] Jan. 16, 1973

[54] REFLECTED-BEAM RANGING SYSTEM

[75] Inventor: Dietrich Muller, Achim, Germany

[73] Assignee: Fried Krupp Gesellschaft mit beschrankter Haftung, Essen, Germany

[22] Filed: May 19, 1971

[21] Appl. No.: 144,784

[52] U.S. Cl..................340/3 R, 340/3 D, 343/5 CD, 343/8
[51] Int. Cl................................................G01s 9/66
[58] Field of Search..........340/3 D, 3 R; 343/5 CD, 8

[56] References Cited

UNITED STATES PATENTS 3,617,997  11/1971  Maass et al. ..........................340/3 R

*Primary Examiner*—Richard A. Farley
*Attorney*—Spencer & Kaye

[57] ABSTRACT

A reflected-beam ranging system in which echo signals are displayed cartographically on the screen of a color picture tube having at least two color components. A circuit means, including frequency selective filter means and rectifying means, for providing a pair of output signals whose amplitudes contain the Doppler information is connected to each output of the echo receiver, which preferably has a plurality of outputs one for each sector of the ranging field. The pair of output signals are mixed in a mixing means whose outputs are applied to the respective color control amplifiers of the color picture tube so as to display the echo signals in different colors depending on the Doppler content of the signals. The circuit means may, for example, comprise a frequency discriminator and a rectifier for providing the pair of output signals from the output signal of the receiver, or a high-pass filter and a low-pass filter whose outputs are separately rectified to provide the pair of output signals.

10 Claims, 5 Drawing Figures

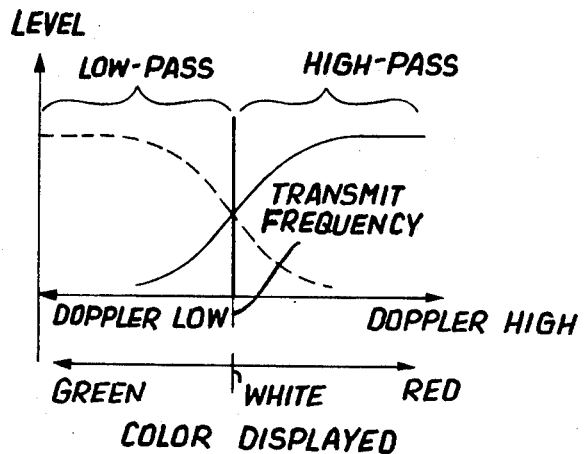
Fig. 3
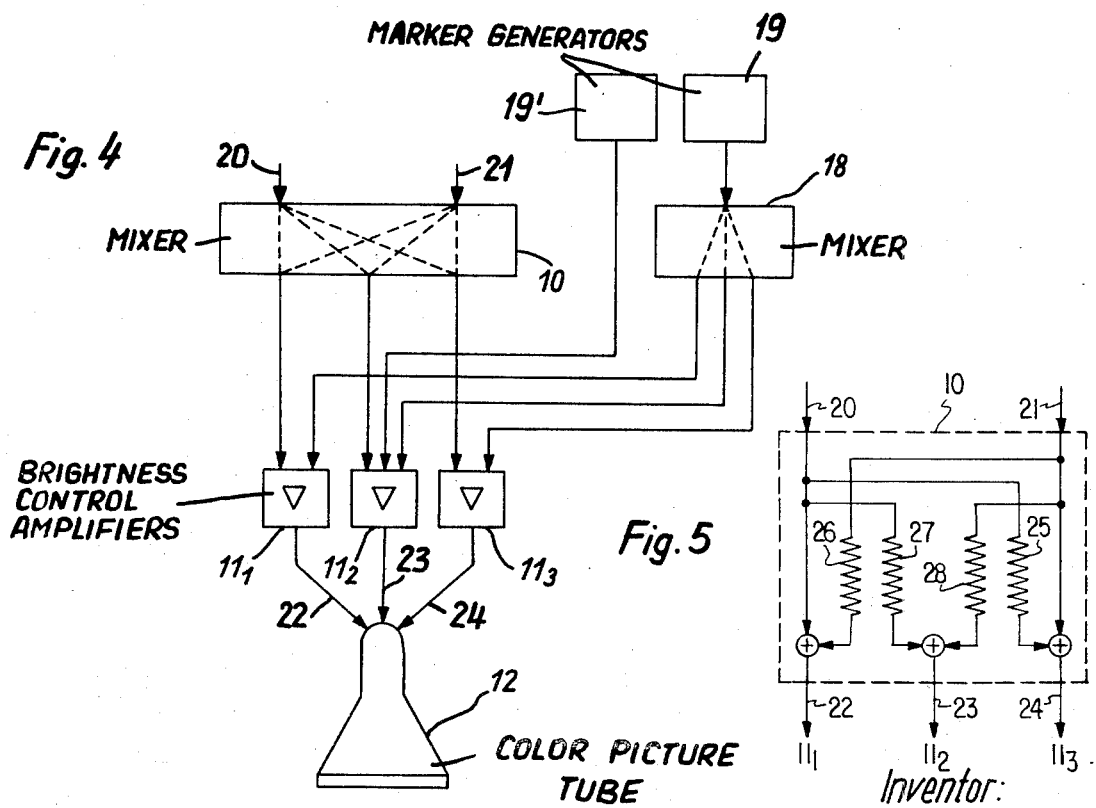
Fig. 4
Fig. 5

REFLECTED-BEAM RANGING SYSTEM

CROSS REFERENCE TO RELATED APPLICATION

This application discloses subject matter related to co-pending application, Ser. No. 888,510, filed Dec. 29th, 1969, by Heinrich Maass and Reinhard Wilhelm Leisterer, now U.S. Pat. No. 3,617,997.

BACKGROUND OF THE INVENTION

The present invention relates to a reflected-beam ranging system with a display of the echo signals in cartographic representation on the screen of a color picture tube having at least two color components, filters for obtaining Doppler information from the echo signals and devices for displaying the echo signals in different colors with respect to their Doppler content.

The above-mentioned co-pending application, Ser. No. 888,510 shows the use of a color picture tube for the distinctive display of echo signals with reference to their Doppler content. In this application, the received echo signals are divided in a known manner into signals containing either Doppler shifts to higher and lower frequencies and signals without a Doppler shift. The three different Doppler state signals are processed separately and displayed with a fixed association to one of the three color components of the color picture tube.

It has been found, however, that the device of the above-mentioned invention in no way fully utilizes the advantageous possibilities of the use of a color cathode-ray tube for the problem at hand.

SUMMARY OF THE INVENTION

It is therefore the object of the present invention to provide a reflected-beam ranging system with a display of the ranging information, including its Doppler content with reduced circuitry.

It is a further object of the present invention to provide such a reflected-beam ranging system with the additional possibility of the insertion of colored auxiliary markers in the display to facilitate the evaluation of the display.

The above and other objects are briefly accomplished according to the present invention in that in a reflected-beam ranging system in which echo signals are displayed cartographically on the screen of a color picture tube having at least two color components, every signal output of the echo receiver is provided with a frequency selective filter network with subsequent rectification which is connected with the color control amplifier of the color picture tube via a mixer device.

More specifically, according to the invention, a circuit means, including frequency selective filter means and rectifying means, is connected to each output of the receiver for producing a pair of output signals whose amplitudes contain the Doppler information. The pair of output signals are applied to a mixing means, whose outputs are connected to the color control amplifiers of the color picture tube, to mix the pair of signals so that the output signals therefrom cause the echo signals to be displayed in different colors depending on the Doppler content of the echo signals.

As compared to the system of the above-mentioned application, the circuitry of the present invention with respect to the numerous signal outputs, is substantially reduced. That is, the number of Doppler processing channels is reduced, for example, from three to two. This results, particularly for large-scale systems comprising a plurality of individual sectors, i.e. signal outputs, in a substantial saving not only in the amount of apparatus employed, in electrical power requirement and weight, but also in possible error sources.

Furthermore, the solution according to the invention permits utilization of the possible variations in the color display by means of color picture tubes. Whereas in the system shown in the mentioned application, the three Doppler signal channels have a fixed association with the three given basic colors, it is now possible, with the intermediate connection of a mixer device, to produce any desired color mixture including white by the appropriate excitation of the respective color control amplifier of the color picture tube. This mixer device distributes, with the aid of known electronic circuits, the signal voltages to the individual inputs of the color control amplifier according to the desired color and according to the color reproduction characteristics of the color picture tube.

It is also possible, for example for signals originating from approaching objects, i.e. signals having Doppler shifts toward higher frequencies which, for phychological reasons, are preferably assigned to the red range of the color scale, to indicate the degree of Doppler shift and thus the speed at which they approach by the shade of the particular color.

A similar color shade variation is available in the same manner to provide a differentiated display of objects moving away at different relative speeds, which are assigned, for example, to the green range.

Signals from objects without a Doppler component lead, for example, to a uniform actuation of three color components so that a white shade results.

Independent of the previously discussed display of objects, according to a further feature of the invention the use of a further mixer device permits the display of markers for identifying interesting details on the picture screen in any desired selection of colors.

A known frequency discriminator whose output carries a positive, a negative or no voltage, depending on the frequency position of the echo signals, is a simple solution for the frequency selective network for detecting the Doppler information according to one embodiment of the invention. The mixer device then forms the desired control of the color components from this voltage information.

According to another embodiment of the invention, the frequency selective network may also consist of a high-pass filter and a low-pass filter which may partially overlap each other with their limit frequencies. The output voltages of the two filter networks are then rectified and are again fed to the appropriate inputs of the mixer device.

The mixer device may include, for example, known summing and difference-forming arrangements of resistors and amplifiers, as well as diodes, so that only voltages of a certain polarity are selected.

The color picture tube may be the shadow-mask tube known from the television art or one of the recently developed systems in which the color of the display is determined by a change in the high-tension voltage.

Since the phosphores conventionally used in color picture tubes possess relatively short afterglow periods, an intermediate storage of the echo information is necessary for the evaluation of the display.

The storage devices required for this purpose may operate according to the most varied methods corresponding to the known state of the art. The method selected depends on individual points of view and has no influence on the present invention.

BRIEF DESCRIPTION OF THE DRAWINGS

FIG. 3 shows the filter characteristics for the distribution of the Doppler informations.

FIG. 4 is a supplement to the circuit diagrams of FIGS. 1 and 2 for the use of colored markers.

FIG. 5 is a schematic circuit diagram of an example of a mixing device which can be used in the systems according to the invention.

DESCRIPTION OF THE PREFERRED EMBODIMENTS

Figure 1:
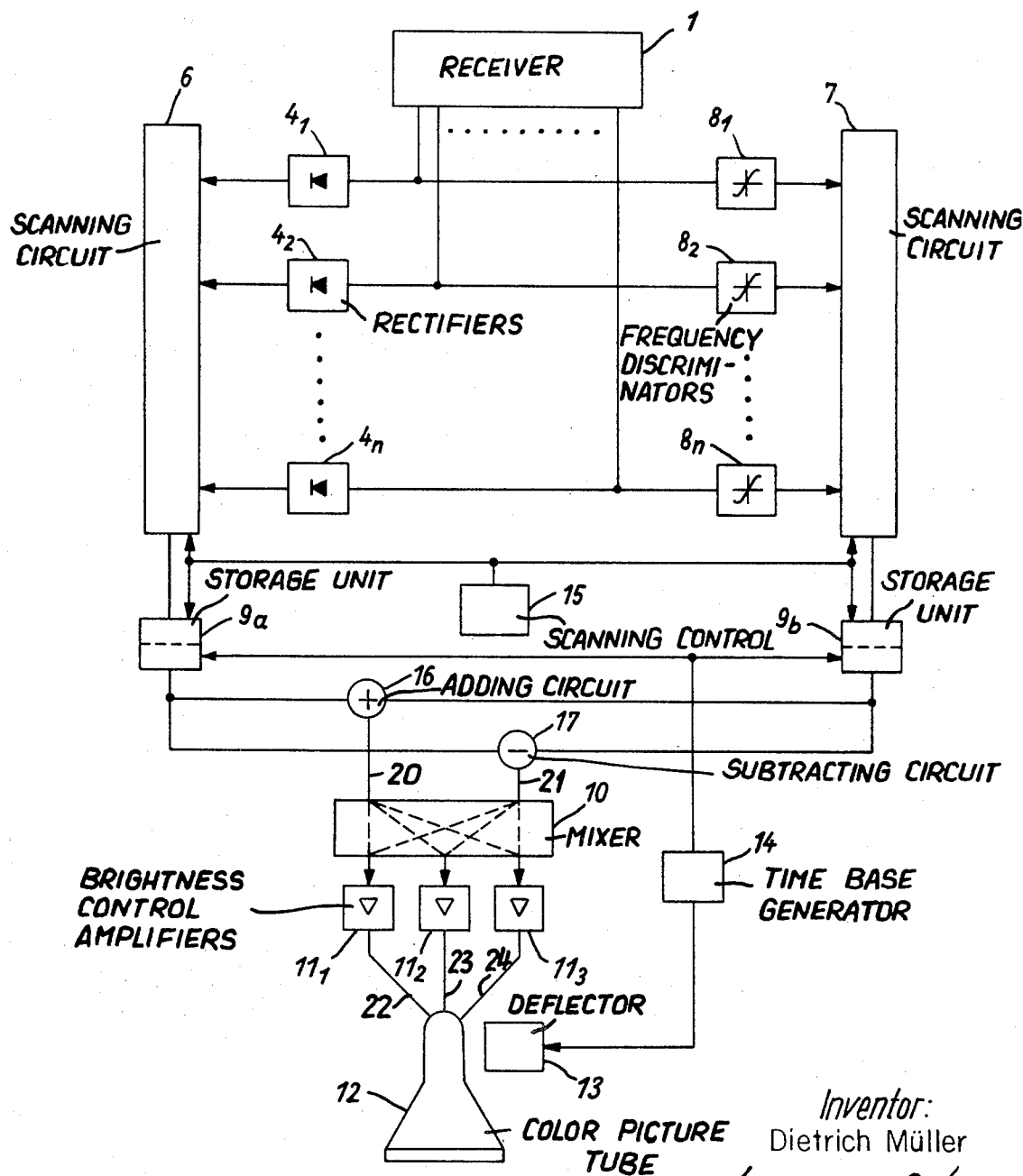
FIG. 1 is a basic circuit diagram of an arrangement for processing the received echo signals by means of discriminators.

Referring now to FIG. 1 there is shown a receiver 1 for a reflected-beam ranging system, e.g. a sonar system, with the number of individual ranging sectors of the sonar system corresponding to the number $n$ of the signal outputs of the receiver 1.

Connected to each signal output of receiver 1 is a separate circuit arrangement for providing a pair of output signals whose amplitudes contain the Doppler information. Each of these circuit arrangements contains a respective rectifier $4_1$ to $4_n$ and a respective frequency discriminator $8_1$ to $8_n$ whose inputs are each connected to the respective output of the receiver and at whose outputs appear the respective above-mentioned pair of output signals. The signals which are rectified by rectifiers $4_1$ to $4_n$ independent of their frequency are scanned by a scanning circuit 6 in chronological sequence and are read into a memory-type storage unit $9a$. Similarly the output signals of the frequency discriminators 8, whose output signals have a positive or a negative polarity or a zero value depending on the frequency position of the received signals with respect to the frequency of the transmitted signal, are scanned by a scanning circuit 7 which feeds these signals into a memory-type storage unit $9b$. The scanning process by means of scanners 6 and 7 is synchronized with the reading of the scanned information into the storage units $9a$ and $9b$ by means of a scanning control 15.

Pursuant to the control signals from a time-base generator 14, which also control the deflection circuit 13 for the color picture tube 12, the information is read out of the storage units $9a$ and $9b$ and simultaneously fed to an adding circuit 16 and a subtracting circuit 17 to form the sum and difference respectively of the read-out signals. The output signals from the adding and subtracting circuits 16 and 17 are then fed to the inputs 20 and 21 of a mixer 10, which may, for example, be a passive resistance network and which distributes the signals to the color control amplifiers of the color picture tube 12 according to the desired color assignment so that the echo signals may be displayed on the screen of the tube in a desired color according to the Doppler content. The brightness control amplifiers $11_1$ to $11_3$ provide an adaptation to the tube characteristics.

Turning now to the mode of operation of the embodiment of FIG. 1, each directional channel signal, i.e. each output signal from receiver portion 1, principally contains amplitude modulated oscillations. The amplitude levels of these signals as determined by the respective rectifiers $4_1 4_n$ are interrogated in succession via scanner 6 and the frequencies of the oscillations as determined by the respective frequency discriminators $8_1$ to $8_n$ are interrogated via scanner 7. These interrogated values are stored in an associated relationship in memory 9 in the proper time sequence. Scanners 6 and 7 thus determine which direction is momentarily being processed. From the elapsed time since the beginning of each sounding period, i.e. the time between transmission and receipt of the echo, the distance from which the momentarily processed signal energy is being reflected can be determined and displayed in a known manner. In addition to the ranging information, however, the present invention also simultaneously provides the Doppler information. The output of frequency discriminators $8_1$ to $8_n$ is assumed to be such that with a Doppler high the value stored in memory $9b$ is positive, with a Doppler low it is negative, while with no Doppler shift it is zero. The output of rectifiers $4_1$ to $4_n$ is such that the value stored in memory 9a is positive. Thus after addition and subtraction of the respective signals from memories $9a$ and $9b$ in circuits 16 and 17 respectively a Doppler high will result in a maximum signal level at the input 20 of the mixer stage 10 and a Doppler low in a maximum signal level at the input 21 of mixer stage 10. Substantially equal value signals are applied to both inputs 20 and 21 when the received signal has Doppler zero since in such case the value stored in memory $9b$ shows the value zero.

The mixer 10, by means of the internal interconnections between the inputs 20 and 21 and the respective outputs 22, 23, 24 connected to the control amplifiers $11_1$, $11_2$ and $11_3$, provides output signals to the control amplifiers to produce a display of the echo signal being momentarily processed on the screen of the picture tube 12 in a desired color indicative of the respective inputs to the mixer and thus of the Doppler content. The internal interconnections of the mixer 10 are preferably such that the two extreme Doppler states (Doppler high and Doppler low), which are indicated by a maximum input signal at either input 20 or input 21 will cause a respective one of the color guns of the tube 12, e.g. the gun connected to amplifiers $11_1$ or $11_3$, to provide a substantially basic color indication, e.g. a red indication for a maximum signal at input 20 indicating a Doppler high and a green indication for a maximum input signal at input 21 indicating a Doppler low. For equal signals appearing at inputs 20 and 21, the output signals to amplifiers $11_1$ and $11_3$ are substantially equal causing a gray display to result on the face of the tube 12. The intensity of the gray display, i.e. the degree of purity of the desired white indication, is determined by the magnitude of the output signal supplied to the third color component via the control amplifier $11_2$.

A passive network which may be utilized for the mixer 10 is shown in FIG. 5. As indicated, each of the inputs 20 and 21 are directly connected to a respective output 22 or 24 and via respective transverse coupling resistances 25 and 26 to the outputs 24 and 22 respectively. Each of the inputs 20 and 21 is likewise connected via a respective transverse resistance 27 and 28 to the output 23 for the third color component of the picture tube. The relationship between the transverse resistances will determine the degree of mixed color additions to the basic color indications for the Doppler indications, i.e. red or green, and is preferably such that few mixed color additions will result when either extreme Doppler state is to be indicated. The size of the resistances 27 and 28 determines the magnitude of the output signal of output 23. By adjusting the relative values of these resistances the gray intensity of the display, indicating Doppler zero, may be adjusted.

Figure 2:
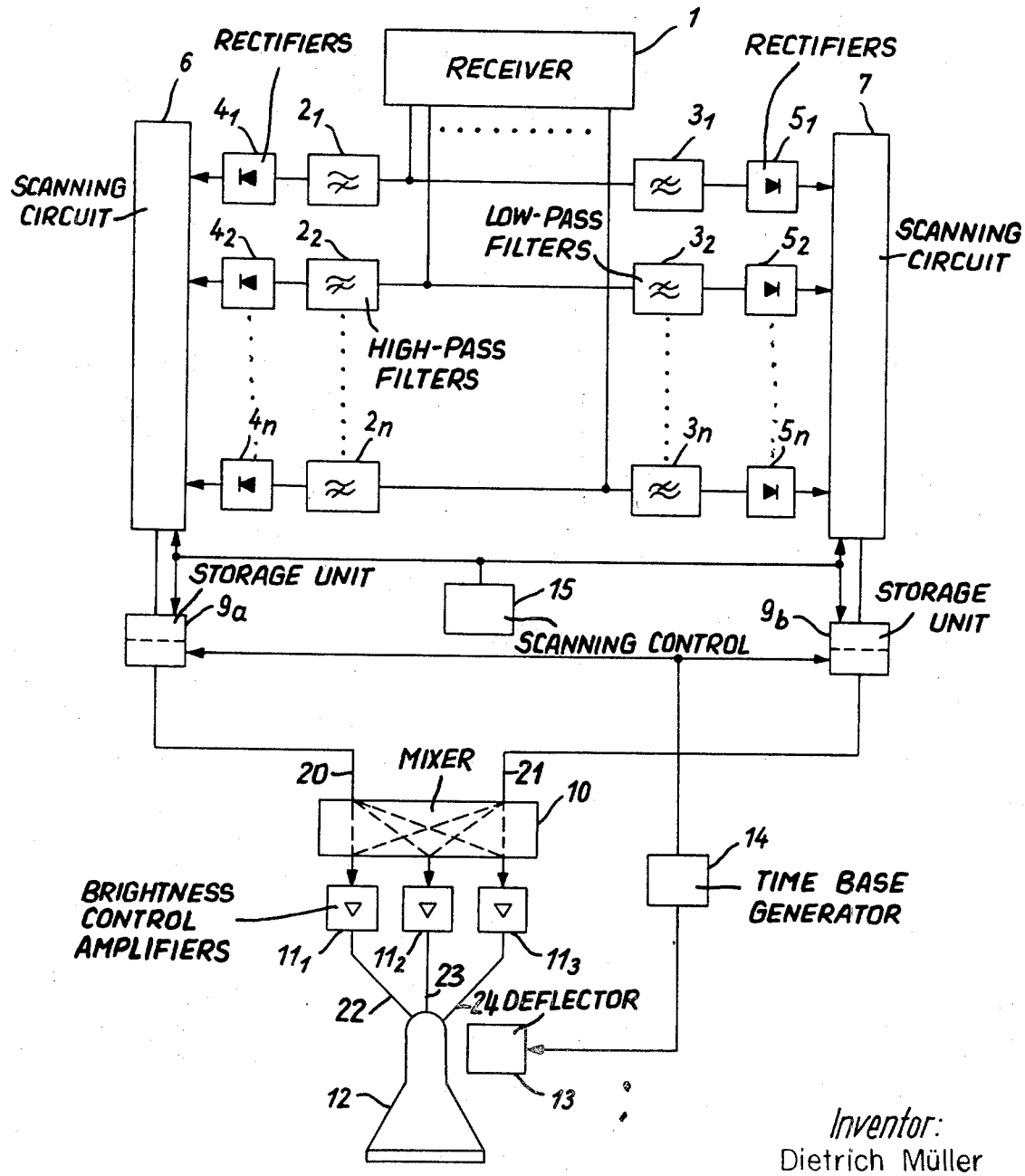
FIG. 2 is a basic circuit diagram of an arrangement for processing the received echo signals by means of high-pass and low-pass filters.

In a modified embodiment of the invention according to FIG. 2, each of the respective circuits connected to the outputs of receiver 1 includes a respective high-pass filter $2_1$ to $2_n$ and a low-pass filter $3_1$ to $3_n$ which have their inputs directly connected to the respective signal output of the receiver 1 and their outputs connected to rectifiers $4_1$ to $4_n$ or $5_1$ to $5_n$, respectively. The received echo signals are thus fed, depending on their frequency shift due to the Doppler effect, to either rectifiers $4_1$ to $4_n$ or rectifiers $5_1$ to $5_n$.

As with the embodiment of FIG. 1, the individual rectified voltages are sequentially scanned by scanning circuits 6 and 7 with the aid of a scanning control circuit 15, and fed into storage units 9a and 9b respectively.

Read-out again occurs in a manner determined by the recording pattern on the screen of the color picture tube 12 and controlled by a time-base generator 14. The read-out signals are fed to the mixer device 10 which feeds the signals to the color picture tube 12 in the same manner as in FIG. 1.

As shown in FIG. 3, the filters 2 and 3 are dimensioned so that their pass characteristics partially overlap, i.e. the upper limit frequency of filter 3 is above the lower limit frequency of filter 2. Thus echo signals without Doppler information result in a uniform control of the brightness control amplifiers $11_1$ to $11_3$ so that the display will occur in a white color shade. The illustration in FIG. 3 also shows that differences in the height of the Dopper are expressed as differences in color saturation in the display.

FIG. 4 illustrates an enlargement of the circuit diagrams shown in FIGS. 1 and 2, whereby markers may be provided on the screen of the picture tube 12 for identifying interesting details on the screen.

With such markers, the positions of fixed signals such as sonar reflectors or other navigation aids or impediments can be identified. Different color markers can also be used with advantage for auxiliary displays as used in the radar art. This also includes, in addition to the use of bearing traces, the division of the screen into distance zones by distance indication rings of different colors which, as regard the circuitry employed, is already part of the state of the art for ranging systems with a display on black and white picture screens.

As shown in FIG. 4, additional marker generators 19 and 19' are provided to produce such markers. The output signals from the marker generator are utilized to control one or more of the color control amplifiers $11_1$ to $11_3$. The markers may here be produced in a manner similar to that described for the display of the echo signals by connecting the output of generator 19 to the control amplifiers $11_1$ to $11_3$ via an additional mixer device 18 to selectively provide color mixtures from red over white to green. Alternatively, the output of marker generator 19' is directly connected to the input of control amplifier $11_2$ and thus serves only to produce markers in one of the basic colors by actuating a single color component.

It will be understood that the above description of the present invention is susceptible to various modifications, changes and adaptations and the same are intended to be comprehended within the meaning and range of equivalents of the appended claims.

I claim:

1. In a reflected-beam ranging system in which received echo signals are displayed cartographically on the screen of a color picture tube having at least two color components the improvement comprising, in combination: a receiver for receiving echo signals and providing an electrical signal corresponding thereto at an output thereof; circuit means, including frequency selective filter means and rectifying means, connected to the output of said receiver for producing a pair of output signals whose amplitudes contain the Doppler information in the output signals from said receiver; and, mixing means responsive to said pair of output signals for applying control signals to the respective color control amplifiers of said color picture tube to cause the received echo signals to be displayed in different colors depending on the Doppler content thereof.

2. The reflected-beam ranging system defined in claim 1 wherein said receiver has a plurality of outputs, one for each individual sector of the area being scanned by the ranging system; wherein a separate one of said circuit means is connected to each of said plurality of outputs of said receiver; and wherein said system includes means for sequentially scanning the outputs of said circuit means and supplying said pair of output signals to said mixing means.

3. The reflected-beam ranging system as defined in claim 1 wherein said frequency selective filter means comprises a frequency discriminator for providing an output signal indicative of the Doppler shift of the received echo signal; and wherein the input of said frequency discriminator and input of said rectifying means are each connected to said output of said receiver and the respective output signals from said rectifying means and said frequency discriminator constitute said pair of output signals from said circuit means.

4. The reflected-beam ranging system defined in claim 3 further comprising means for combining said pair of output signals before they are fed to said mixing means, said means for combining including: means for adding said pair of output signals and for feeding a signal representation of the sum thereof to one input of said mixing means, and means for subtracting said pair of output signals and for feeding a signal representative of the difference thereof to a second input of said mixing means.

5. The reflected-beam ranging system defined in claim 1 wherein said rectifying means includes a pair of rectifiers and said frequency selective filter means includes a high-pass filter and a low-pass filter, each of which has its input connected to the output of said receiver and its output connected to the input of a respective one of said rectifiers, the outputs of said rectifiers constituting said pair of output signals from said circuit means.

6. The reflected-beam ranging system defined in claim 5 wherein the cut off frequency of said high-pass filter is lower than the cut off frequency of said low-pass filter so that the pass characteristics intersect at a frequency equal to the frequency of the signal transmitted by said system.

7. The reflected-beam ranging system defined in claim 4 wherein said color picture tube includes three color components; wherein said mixing means includes first and second inputs and three outputs each output of which is connected to the color brightness control amplifier of a different one of said color components, said mixing means including circuit means interconnecting said first and second inputs with said three outputs to provide output signals thereat for substantially equally activating said three color components to cause a white display on said color picture tube, indicating Doppler zero, when substantially equal signals are applied to said first and second inputs, and for selectively varying the activation of said three color components to cause a display of a first or a second of said colors, indicating a Doppler high or a Doppler low, respectively, when different signals are applied to said first and second inputs.

8. The reflected-beam ranging system defined in claim 6 wherein said color picture tube includes three color components; wherein said mixing means includes first and second inputs and three outputs each output of which is connected to the color brightness control amplifier of a different one of said color components, said mixing means including circuit means interconnecting said first and second inputs with said three outputs to provide output signals thereat for substantially equally activating said three color components to cause a white display on said color picture tube, indicating Doppler zero, when substantially equal signals are applied to said first and second inputs, and for selectively varying the activation of said three color components to cause a display of a first or a second of said colors, indicating a Doppler high or a Doppler low, respectively, when different signals are applied to said first and second inputs.

9. The reflected-beam ranging system defined in claim 1 further comprising marker generating means for providing output signals for causing the display of auxiliary colored markers on said color picture tube which markers are independent of the displayed echo signals, the output signals of said marker generating means being coupled to respective inputs of said color brightness control amplifiers.

10. The reflected-beam ranging system defined in claim 9 including a further mixing means, connected between the output of said marker generating means and the input of said color brightness control amplifiers for selectively mixing said output signals from said marker generating means so as to provide for a display of said markers in any desired color.

* * * * *